US009996822B2

(12) United States Patent
Sung et al.

(10) Patent No.: US 9,996,822 B2
(45) Date of Patent: Jun. 12, 2018

(54) SYSTEMS AND METHODS FOR IDENTIFYING HIDDEN TALENT

(71) Applicant: Mercer (US) Inc., New York, NY (US)

(72) Inventors: Patty Pei-yi Sung, New York, NY (US); Barbara Marder, Baltimore, MD (US); Jonathan Meyers, San Francisco, CA (US); Aikaterini Rodriguez, Ossining, NY (US); Kevin Lin, Elmhurst, NY (US)

(73) Assignee: MERCER (US) INC., New York, NY (US)

( * ) Notice: Subject to any disclaimer, the term of this patent is extended or adjusted under 35 U.S.C. 154(b) by 242 days.

(21) Appl. No.: 14/267,488

(22) Filed: May 1, 2014

(65) Prior Publication Data

US 2014/0330734 A1  Nov. 6, 2014

Related U.S. Application Data

(60) Provisional application No. 61/817,965, filed on May 1, 2013.

(51) Int. Cl.
*G06Q 99/00* (2006.01)
*G06Q 10/10* (2012.01)
*G06Q 10/00* (2012.01)

(52) U.S. Cl.
CPC ................ *G06Q 10/1053* (2013.01)

(58) Field of Classification Search
USPC .......................................... 319/1.1, 316, 500
See application file for complete search history.

(56) References Cited

U.S. PATENT DOCUMENTS

| 5,987,415 | A * | 11/1999 | Breese et al. ............... 704/270 |
| 6,795,808 | B1 * | 9/2004 | Strubbe et al. ............. 704/275 |
| 8,001,057 | B1 | 8/2011 | Hill |
| 8,398,490 | B1 | 3/2013 | Phelon et al. |
| 2002/0165019 | A1 * | 11/2002 | Slomiany ............... G07F 17/32 463/16 |
| 2007/0190504 | A1 | 8/2007 | Schwartz et al. |
| 2007/0269786 | A1 | 11/2007 | Jeon |
| 2010/0312605 | A1 * | 12/2010 | Mitchell et al. .............. 705/9 |
| 2010/0332405 | A1 * | 12/2010 | Williams ................... 705/319 |
| 2013/0325536 | A1 | 12/2013 | Podlaseck et al. |
| 2013/0344968 | A1 | 12/2013 | Halfteck et al. |

OTHER PUBLICATIONS

Potworowski, Georges A. Varieties of Indecisive Experience: Explaining the Tendency to Not Make Timely and Stable Decisions, 2010 (Available online at least Jun. 17, 2010), accesed Dec. 26, 2016.*

(Continued)

*Primary Examiner* — Amanda C Abrahamson
*Assistant Examiner* — Shaun D Sensenig
(74) *Attorney, Agent, or Firm* — Fish IP Law, LLP

(57) ABSTRACT

A candidate assessment system reviews gaming data from a plurality of players to determine how well those players fit a particular job opening. The system uses one or more interpretation metrics to derive skill sets for each player by analyzing game attribute data from game scenarios played by the player. Each interpretation metric is generally unique, allowing the candidate assessment engine to derive a player's skill sets in markedly different ways.

20 Claims, 6 Drawing Sheets

(56) References Cited

OTHER PUBLICATIONS

Connect Cubed entitled "Frequently Asked Questions" located at http://web.archive.org/web/20130508085726/http://connectcubed.com/partner/faq, dated May 8, 2013.
Prophecy Sciences entitled "Predicting performance through neuroscience" located at http://web.archive.org/web/20131121041739/http://prophecysciences.com/, dated Nov. 21, 2013.

\* cited by examiner

| Joseph Smith | | Metric 8 |
|---|---|---|
| Game Attributes | ◄ | Job position fit |
| Time to finish | 18:04 | 93% potential for Administrative Assistant 2 |
| Number of deaths | 8 | 84% potential for Administrative Assistant 1 |
| Problems solved | 6/9 | 68% potential for Computer Programmer |
| Colleague team | 1 | 55% potential for Sales Representative 1 |
| Idle time | 7:12 | 55% potential for Sales Representative 2 |
| | ► | 23% potential for Project Manager |
| | | 0% potential for Accountant |
| Skill Attributes | ◄ | Suggested Follow-up Games |
| Adaptability | 40% | Tech support Situation 1 for Empathy |
| Charisma | 80% | Tech support Situation 3 for Empathy and Positive Personality |
| Empathy | ?? | Diva Personal Assistant for Adaptability and Empathy |
| Follows Instructions | 100% | |
| Organization | 90% | |
| Positive Personality | ?? | |
| | ► | |

Figure 5

SYSTEMS AND METHODS FOR IDENTIFYING HIDDEN TALENT

This application claims priority to U.S. Provisional Application No. 61/817,965 filed May 1, 2013, which is incorporated by reference in its entirety.

FIELD OF THE INVENTION

The field of the invention is candidate and talent identification technologies.

BACKGROUND

The background description includes information that may be useful in understanding the present invention. It is not an admission that any of the information provided herein is prior art or relevant to the presently claimed invention, or that any publication specifically or implicitly referenced is prior art.

Employers are constantly trying to find the best possible candidates to fill their employment needs. Traditional approaches to finding candidates generally involve filtering candidate credentials included in resumes and evaluating candidates during the interview process with human-created metrics, questionnaires or interview questions to evaluate how well candidates fit the position in question. As such, the accuracy of a candidate assessment can vary since a candidate may or may not prepare for the process by tailoring the resume towards a specific job opening and/or couch the interview in a way to optimize what the candidate thinks the potential employer wants to see and hear, and interviewers vary in their ability to gauge such a candidate during the interview time period. Additionally, such an approach limits the candidates to those that meet the traditional requirements "on paper." Thus, the employer is unable to evaluate potential candidates having valuable talents that cannot be measured by the traditional approach of evaluating a candidate through a resume and one or two interviews.

U.S. patent application publication US 2013/0325536 to Podlaseck, et al, titled "Measuring Short-Term Cognitive Aptitudes of Workers For Use In Recommending Specific Tasks," filed May 30, 2012, discusses a method of testing the aptitude of workers by having each worker play a cognitive aptitude measurement game. Podlaseck then analyzes workers' gameplay as a basis for recommending that worker for a specific task. However, Podlaseck also fails to contemplate that one employer may evaluate and/or interpret game metrics in a different way than another employer when assessing aptitudes based upon gameplay data.

U.S. patent application publication US 2013/0344968 to Halfteck, et al, titled "System And Method For Extracting Value From Game Play Data", filed Jun. 5, 2013, also discloses a system that has workers play through game scenarios similar to work scenarios. Halfteck's system then uses that gameplay data to determine personality traits that match a game player with an open position. Halfteck also teaches that different matching service customers could be interested in different aspects of the analysis results. However, Halfteck's system applies the same sort of analysis to each worker's gameplay performance.

Non-patent literature website publication by Prophecy Sciences, dated Nov. 21, 2013, titled "Predicting performance through neuroscience" discusses that a person's ideal work environment could be found via cognitive games, biometric signals and machine learning algorithms. Prophecy Sciences, however, fails to explain how predictions about a person are made, how any testing is conducted or how such tests are interpreted to analyze a particular individual.

Non-patent literature website publication of by ConnectCubed, dated May 8, 2013, titled "Frequently Asked Questions" discloses the use of assessment games that are used to evaluate employment candidates. However, while ConnectCubed discusses tapping into new talent pools, ConnectCubed fails to discuss how game results may apply to non-traditional candidates.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved systems and methods of evaluating potential candidates that enable an organization to recognize non-traditional sources of talent.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

SUMMARY OF THE INVENTION

The inventive subject matter provides apparatus, systems and methods in which a candidate assessment system assesses a job candidate's suitability for a job by applying a variety of analysis metrics to a variety of gameplay aspects recorded while the candidate plays a game.

The system preferably includes a candidate matching engine. The candidate matching engine could be embodied by computer-readable instructions stored on one or more non-transitory memory (e.g., RAM, ROM, flash, hard drives, solid state drives, optical media, etc.), coupled to one or more processors within one or more computer systems, where the instructions are executable by the processor(s) to carry out various functions and processes associated with the inventive subject matter. The candidate matching engine could alternatively be a dedicated hardware device, such as a processor having embedded instructions specially programmed to carry out functions associated with the inventive subject matter. The candidate matching engine could include one or more interfaces, such as communication or device interfaces, that could communicatively couple with other computer systems, computing devices, or peripheral devices. For example, the candidate matching engine could have one interface functionally coupled to a gaming system to collect game attribute data, another interface functionally coupled to a database to collect historical game attribute data, skill attribute data, and/or job profile information, and another interface functionally coupled to a user interface that allows a user of the system to define, analyze, and process analytic games, job profiles, or prospective employee profiles.

The system could also include one or more databases that store data to be retrieved and/or processed by the candidate matching engine. Each database is generally stored on one or more non-transitory computer-readable mediums and is functionally coupled to the candidate matching engine in some manner, for example through a serial interface cable or a network interface. A skills database could store skill attributes representative of a job candidate's skills and characteristics of skills which would be useful for an employer, such as abilities, habits, dispositions (e.g. demeanors, mindsets, etc. of a person), and presentation skills of the prospective employee. The skill attributes could be presented to a user of the system as strengths or weaknesses of a player (e.g., honesty vs. tendency to lie attributes) but are preferably normalized within the database to prevent duplicates (e.g., a degree of honesty covering a spectrum of honesty and dishonesty). Examples of skill attributes include risk, decisiveness, impulse, critical thinking, ability to learn, ability to follow instructions, creativity, adaptability, teamwork, leadership, support, demeanor, personality, logic, legal, thoroughness, morality, empathy, recollection/memory, prioritizing, organization, focus, emotion, determination, ambition, and follower/loyalty.

Skill attributes can include light technical skill attributes representative of the light technical skills possessed by a candidate. Examples of light technical skill attributes can include proficiency with programs, equipment, etc., and industry-specific knowledge possessed by a candidate. Game attributes can be correlated to light technical skill attributes by interpretation metrics such that the game attributes are representative of interactions in-game situations, obstacles, and player decisions, reactions and interactions that only a candidate having a particular light technical skill would exhibit.

A game attributes database could store one or more player's game attributes which would be useful to derive one or more skill attributes, and could be stored with specificity or generalized to indicate a pattern. Examples of specific game attributes include a player's interactions to a specific enemy a specific puzzle, a specific type of enemy, or a specific type of puzzle. Examples of general game attributes include a player's interactions with an entire game from start to finish, or even a plurality of play-throughs throughout a game from start to finish. Any suitable game attribute could be collected in order to determine how well a player matches a job prospect. For example, the game could track one or more player's accuracy, game playing time, input, decision, response time, reaction time, decision time, periods of inactivity, game path, percentage completed, trial-and-error (e.g., how many possible outcomes are tried by the player until success), repeated mistakes, goal outcome, gameplay stats, number of attempts, number of lives, score, rank, in-game skill level, scenario settings, controller configuration, difficulty settings, settings, and gamer profile information.

A job database could also be used to define job profiles that associate a job opening with a set of prospective skills for that job opening. For example, a job opening for an administrative assistant might require an ability to adapt to a new computing system, an ample amount of patience with clients, and an ability to both organize a schedule and effectively communicate that schedule to a plurality of parties, whereas a job opening for a computer programmer might require an ability to create custom computer environments from a variety of disparate sources, an aggressive, risk-taking attitude to accomplish tasks, and a flexible schedule for meeting deadlines. Employers could define these skills for themselves using a user interface coupled to the system, or these skills could be provided as exemplary templates. In a preferred embodiment, employers and managers could take personality tests to determine what types of skill-sets could be optimally matched with prospective employees. Skill sets associated with an employment position could be ranked in terms of priority and preferences, and some of which could be designated as required skills for the employment position, while others are designated as preferred skills for the employment position. Where two prospective employees have the same skills, a designated priority in favor of certain skills over other skills could be used to improve the match of one prospective employee for the employment position over the other.

The contemplated databases and the candidate matching engine could be integrated into a single computing system, or could comprise separate devices having communication interfaces that allow the devices to be communicatively coupled with one another, such as via a network connection. The communication interfaces could be wired or wireless communication interfaces, and could include short-range or long-range communication interfaces. Exemplary communication interfaces include WiFi, Ethernet, USB, Bluetooth, Near-Field Communication, cellular, etc. The data exchanged between the components of the system could be over networks such as the Internet, a cellular network, a local-area network (LAN), a wide-area network (WAN), VPN, or other type of packet-switched network.

The candidate matching engine could also be communicatively coupled via one or more communication interfaces to computing devices that allow users to interact with the system, and that allow the system to send and receive data from these computing devices for the various functions of the inventive subject matter.

Generally, the candidate matching engine is configured to receive one or more game attributes that is representative of a player's interaction with one or more game scenarios. As used herein, a "game scenario" includes a finite portion of a game within which at least one player attribute is recorded. Game scenarios could be as narrowly defined as a battle or a puzzle within a game, or as broadly defined as an entire time period of a game from start to finish, which could encompass a plurality of days. Contemplated game scenarios include situations, challenges, obstacles, levels, portions of a level, puzzles, opponents, challenges, simulated technical problems with a game, portions of a game, entire games, role-playing games, combat games, puzzle games, driving games, flight simulator games, real-time strategy games, turn-based strategy games, adventure games, quest games, scavenger games, card games, games of chance, single and multi-player games, board games, viral games, video games, athletic contests, and even unwinnable games.

In order to collect game attributes from a game scenario, the candidate matching engine is preferably coupled either directly to a gaming device, such as a gaming console, computer system, or mobile device, or is coupled to a database or other storage device that collects and stores data regarding a player's interactions with one or more game scenarios. Data collection is generally performed through some sort of gaming platform interface, such as a hardware dongle or a software module. Game attributes could be any quantifiable data that could be collected during a player's gameplay of a game scenario, which are preferably measured by hardware of software sensors in terms of a player's decisions, a player's inputs, or a player's reaction. While the candidate matching engine generally has access to any game attribute data, the candidate matching engine is preferably configured to examine a subset of a player's game attribute data as a function of the interpretation metric used.

As used herein, an interpretation metric can be a programmable toolset used to derive a set of talent skills from a set of input game attributes. Such toolsets generally include functions and algorithms that use quantifiable input values from one or more game attributes to derive one or more skill attributes. An interpretation metric could also include criteria according to a dimensionality space to derive a set of skill attributes from the game attributes. Some interpretation metrics may be used to derive a first set of skill attributes from game attributes while other interpretation metrics may be used to derive a different, second set of skill attributes from the same game attributes. Preferably, a user would use several interpretation metrics to derive a complete set of skill attributes for a prospective job. Such interpretation metrics could be defined by a user, or could be automatically derived through analysis of players and their associated game attributes and skill attributes.

In a preferred embodiment, the candidate matching engine is configured to apply a plurality of interpretation metrics to a plurality of sets of game attributes to derive different talent skill sets according to different interpretations. For example, according to one interpretation of gameplay, a player having a period of time with no game input could be considered as having a high "indecisive" skill attribute, whereas according to a different interpretation of gameplay, a player having the same period of time with no game input could be considered as having a high "patient" or "calculating" attribute. Each interpretation could assign a "candidate fit" metric, such as a matching score for a particular job, to a given player and a given job opportunity, and an employer could also assign an "interpretation fit" metric to a selected interpretation and job opportunity, providing multiple ways to rank how well a player matches a job opportunity. Players ranked highly by an employer may not only need to be ranked higher in accordance with an interpretation, but may also need to have that particular interpretation ranked highly by the employer. As used herein, a "high" level and a "low" level mean quantifiable values that are above a given threshold, such as a statistical average, or below a given threshold, respectively. Thresholds are generally defined by a user or an administrator, or could be calculated by the system in accordance with pre-defined formulas. (i.e. an average, a mean, or 80% of the max)

Interpretation metrics could be grouped with one another to provide a variety of differing, but related interpretations. Providing such grouped interpretations could be used to review statistical outliers that are unusually high or low compared to other skill attributes, prospective employees that exceed given thresholds for one or more correlated skill values, or even to show how a positive interpretation could be flipped into a negative interpretation. For example, an employer might want to view how careful and methodical a prospective employee is next to how much of a risk-taker that same prospective employee is, or how friendly a prospective employee is next to how charismatic and how presentable that same prospective employee is, or how many preferred skills a prospective employee has next to how many unusually highly ranked skills that same prospective employee has. By presenting a prospective employee's skills in accordance with a plurality of related interpretations, an employer could achieve a much fuller view of the prospective employee's likelihood of matching the open job position. In some embodiments, the employer could select a first interpretation metric, and then the system selects one or more related interpretation metrics as a function of the first selected interpretation metric. In other embodiments, the system could first analyze a player based upon a first interpretation metric, and could then suggest an alternative interpretation metric based upon the first job candidate assessment, or could select a set of skills that could be analyzed in accordance with alternative interpretation metrics based upon the first job candidate assessment.

In some embodiments, a full spectrum of gaming attributes might be unavailable to the system. In such situations, the engine preferably analyzes the gaming attributes to determine what interpretation metrics could be applied to the gaming attributes, and shows a list of possible interpretation metrics that could be applied based upon the gaming attributes available. In some embodiments, an interpretation metric may be configured to have required gaming attributes needed to derive a skill and preferred gaming attributes useful to derive a skill This would show a granulated list of interpretation metrics having a full set of required gaming attributes and preferred gaming attributes, interpretation metrics having a full set of required gaming attributes and only some preferred gaming attributes, interpretation metrics having a full set of required gaming attributes, and interpretation metrics not having a full set of required gaming attributes. Showing these parameters informs a user of the system whether an interpretation may contain some inaccuracies because some gamer attribute data is unavailable. When an employer wants a certain interpretation metric to be used, but the game attributes needed for such an interpretation metric are unavailable, an alert could be triggered that notifies the employer or a separate module that the available game attributes are insufficient. When such an alert is triggered, the system could be configured to suggest one or more games that could be pushed to a player in order to collect some of those missing game attributes.

The employer's user interface is preferably fully configurable to allow an employer to process the gamer attributes in a variety of ways. Interpretation metrics could be applied to one or more players and one or more games that each player has played. A plurality of interpretation metrics could be applied, and reports could be generated showing each player's derived skills as well as one or more interpretations of how well each player matches one or more job opportunities based upon the applied interpretation metrics. The user interface could be used to define or redefine game attributes, skill attributes, job profiles, interpretation metrics, game mechanics, and so forth.

Where an employer might wish additional information on a job applicant, or perhaps wants a better flushed out set of skill attributes, the employer might push one or more games to the candidate matching engine through the gaming platform interface. In some embodiments, the candidate matching engine could be configured to select such games as a function of the player's job candidate potential. For example, if a player shows high potential for a certain type of job, the candidate matching engine might push games related to that job towards the job candidate to gather more data.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 5 is a screenshot of another exemplary user interface

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including enabling a user to creatively analyze job applicants' ability to match job opportunities through non-traditional analysis of game attributes.

As discussed herein and unless the context dictates otherwise, the terms "player", "candidate" and "applicant" can be considered to be referring to a person whose skills are being evaluated via the playing of a game according to the systems and methods of the inventive subject matter. As such, for the purposes of the description herein and unless context dictates otherwise, "player", "candidate" and "applicant" can be considered to be interchangeable.

As discussed herein and unless the context dictates otherwise, the term "user" can be considered to be referring generally to an individual or entity having access to or interacting with the systems and methods of the inventive subject matter. Thus, in certain embodiments, a player can also be considered a user. However, in preferred embodiments, a "user" is used to refer to an entity, group or individual who is interested in evaluating the skills of the player, or performing functions on behalf of the entity, group or individuals, and are separate from the player. Thus, in preferred embodiments, a "user" can include an administrator, an employer, an HR representative of the employer, a third party service employed by the employer, etc.

Figure 1:
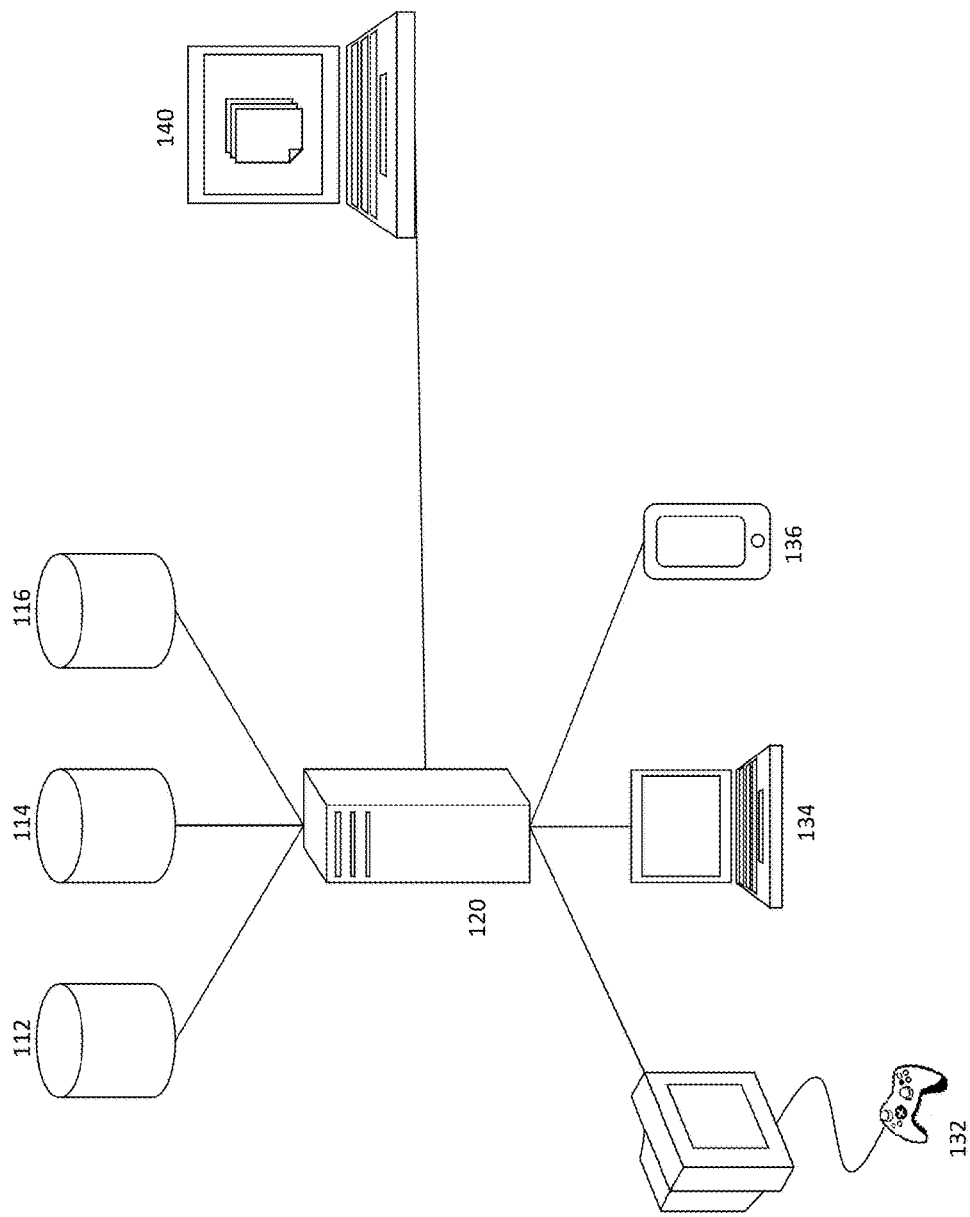
FIG. 1 is a schematic of exemplary hardware used to implement an embodiment of the inventive candidate assessment system.

FIG. 1 provides an exemplary hardware architecture for an embodiment of the inventive candidate assessment system, comprising skill attribute database 112, game attribute database 114, job profile database 116, computer system 120, gaming console platform 132, gaming computer platform 134, gaming mobile platform 136, and administration user interface 140.

Skill attribute database 112, game attribute database 114, and job profile database 116 represent hardware architectures having non-transient memory that store information regarding prospective employees' skill attributes, players' game attributes, and prospective job opportunities' job profiles. Contemplated database architectures could be as simple as a hard drives physically coupled to a motherboard (not shown) of computer system 120, or could be as complex as RAID-striped NAS servers coupled to computer system 120 through a secure port tunneled through a firewalled network interface.

Skill attribute database 112 generally contains quantifiable variables designated as skill attributes by the system, and are subjectively defined as skill attributes that would be useful to a prospective employer with a job opportunity. While skill attribute database could contain traditional, targeted skill attributes, such as a level of proficiency with software programs (i.e. word processors or programming language libraries) and a level of education (i.e. degree from a college or grad school, certifications obtained), skill attribute database preferably also contains non-traditional, generalized skill attributes that are difficult to measure, such as a level of aggressiveness in the workplace or a willingness to work late when deadlines occur Skill attribute database 112 is generally pre-populated with template skill attributes known to be useful to an employer, but is also configured to allow a user of computer system 120 to insert new skill attributes into skill attribute database 112 as needed.

Contemplated generalized skill attributes include a risk-taking attribute (i.e. the level of risk a prospective employee is willing to take to accomplish job-related tasks), decision-making attributes (e.g., ability to make good decisions generally, can also include the nerve exhibited by a prospective employee when making an important decision), impulsive attributes (e.g., the level of impulsiveness a prospective employee has when making a quick decision), caution/carelessness attributes (e.g., the level of carelessness a prospective employee has when making decisions), critical thinking attributes (e.g. the amount and quality of critical thinking an employee makes in a given scenario), ability to learn attributes (e.g., the ability for a prospective employee to learn a category of tasks in a category of learning areas), subordination attributes (e.g., the ability for a prospective employee to follow directions from a person of authority), creativity attributes (e.g., the amount of creativity a prospective employee has when making a decision), adaptability attributes (e.g., the level of adaptability a prospective employee has when presented with an unfamiliar scenario), teamwork attributes (e.g., the amount of teamwork a prospective employee employs when presented with a task that is categorized as higher than average), leadership attributes (e.g., the amount of leadership a prospective employs when leading a group of other employees), supportive attributes (e.g., the amount of support a prospective employee provides when working within a team), demeanor attributes (e.g., the demeanor of a prospective employee when confronted with specified situations), personality attributes (e.g., the personality of a prospective employee), logic attributes (e.g., the level of logic a prospective employee applies to a decision verses the level of emotion), the legal/morality attributes (e.g., ability or willingness to stick to options that follow pre-specified rules or moral codes), thoroughness attributes (e.g., the level of thoroughness a prospective employee performs a task with), empathy attributes (e.g., ability to empathize with others), memory attributes (e.g., the ability of a prospective employee to memorize work-related facts for a short term or long term), prioritization attributes (e.g., the facility at which a prospective employee prioritizes tasks), organization attributes (e.g., the level of organization a prospective employee employs when performing tasks), focus attributes (e.g., the ability and amount of focus the prospective employee has when confronted with multiple stimuli), determination attributes (e.g., the level of determination a prospective employee has to finish a task with a plurality of obstacles), ambition attributes (e.g., the level of ambition a prospective employee has to rise within a company), loyalty attributes (e.g., the level of loyalty a prospective has towards an individual, a group, an organization, etc.), attention to detail attributes (e.g., level of care and attention to details in performing tasks), honesty attributes, integrity attributes, problem-solving attributes (e.g., the ability to solve problems and complete tasks from micro- to macro-level), initiative attributes (e.g., an ability for an individual to be proactive in problem-solving), stress tolerance (e.g., capacity to deal with stress and effectiveness under stress), compliance attributes (e.g., ability of an individual to meet deadlines, stay within prescribed bounds, etc.), self-awareness attributes, respect for others attributes, people management attributes (e.g., ability to manage strengths and weaknesses of others on a team), persistence (e.g., the determination of an individual to complete a task despite obstacles or earlier failures), and a player's ability to multitask.

In some embodiments, such skill attributes are preferably normalized within skill database 112 so that a plurality of skill attributes of different descriptions are simplified. For example, a skill attribute showing that a person is a risk-taker could be equated with a skill attribute showing that a person is aggressive. Corollary normalization could also be applied, so that a high risk-taking attribute is equated with a low methodical attribute, which, in turn, is equated with a high negligence attribute. By using such normalization techniques, a single skill attribute score could be used to create skill attributes on a plurality of different skill attributes that an employer is looking for. So that one employer who is looking for an employee having a high amount of aggression could be shown the prospective employee who exhibits a high amount of risk-taking, and another employer who is looking for an employee who is not negligent would not be shown the prospective employee who exhibits a high amount of risk-taking.

In other embodiments, such skill attributes are kept in separate categories within skill attribute database 112, so as to ensure quantifiable differences between skill attributes. A psychologist designing an interpretation metric may wish for his/her interpretation of a gamer's game attributes to be only designated to measure the level of skill of a player's level of risk-taking, and does not believe that the result is related in any quantifiable manner with the level of a person's aggression. In such embodiments, the system could be configured to ensure that the skill attributes are not normalized.

Game attribute database 114 generally contains quantifiable variables designated as game attributes, which can be derived from hardware and software sensors that collect data while a gamer is playing a game scenario. All aspects of a player's interaction with a game are preferably captured and stored in game attribute database 114 to allow an interaction metric to select from any part of the gaming experience to glean data about a player's skill attributes. Generally game attributes are collected by hardware or software sensors. For example, a hardware accelerometer sensor in a controller could detect how often a player is inactive during puzzle game scenarios, or a hardware video sensor could detect how a player's facial expression might change during times of stress, while a software module could detect how quickly a player makes a decision and how many times a player changes a configuration in the game before proceeding. Game attribute database 114 can be pre-populated with template game attributes that are useful to be collected, but is also configured to allow a user of computer system 120 to insert new game attributes into game attribute database 114 as needed. For example, if a new controller or a new sensor becomes available that is able to collect additional data on a player that was never collected before, or a new type of data metric is created which was never considered to be useful before.

Game attributes for a particular game can be defined a priori, such as by applying pre-existing game attribute types to aspects of a game. In embodiments, the computer system 120 can define applicable game attributes for a particular game can be performed via the recording of gameplay sessions by one or more players of a control group (e.g., a particular group of people in a particular position, a particular demographic group, a group of experienced game players, etc), and analyzing the gameplay data to identify statistical trends in various aspects of the gameplay data (e.g., via statistical analysis, clustering analysis, etc).

Any suitable game attribute could be collected in order to determine how well a player matches a job prospect. Examples of game attributes can include a player's accuracy in a task, a number of times a player repeats a task (e.g., prior to completion of the task, prior to abandoning the task, etc.), a number of times a player repeats a gameplay action associated with a task (e.g., prior to successfully completing the task, prior to abandoning the action and trying a new strategy, moving on to another task, etc.), a player's game playing time, a player's input into a controller or other user interface, a player's decision among several possible game paths to take, a player's response to a particular in-game situation or obstacle, a player's reaction to an in-game situation, a player's decision/reaction time, a player's periods of inactivity, a player's path through a game scenario, a player's percentage of a game scenario explored, a player's percentage of game options explored, a player's amount of trial-and-error before either giving up or accomplishing a task, a player's number of repeated mistakes, a player's resulting game scenario, a player's goal outcome, a player's gameplay stats as a function of time or as a function of how much of the game has been completed, a player's completion percentage, a player's willingness to give up, a player's number of attempts, a player's number of lives left, a player's game scenario score, a player's game scenario rank, a player's game scenario skill level, a player's game scenario settings, a player's controller configuration, a player's difficulty settings, and a player's video and audio settings.

An interpretation metric can be one or more programmable toolsets used to derive a set of talent skills from a set of input game attributes. Such toolsets can include functions and algorithms that use quantifiable input values from one or more game attributes to derive one or more skill attributes. The functions and/or algorithms of a toolset can include correlation rules that correlate one or more game attributes to one or more skill attributes. The correlation rules can include matching rules, statistical grouping algorithms (e.g., clustering, nearest neighbor analysis), whereby one or more of the game attributes can be correlated or associated with one or more skill attributes. The correlations between game attributes and skill attributes can be one-to-one, one-to-many, and many-to-one.

For example, for a particular game, an interpretation metric can include correlation rules such that a game attribute of a detected absence of game interface inputs at a decision point within a game correlates to a skill attribute of player indecision.

In embodiments, correlation rules can include correlations among game attributes such that the game attributes are interpreted according to the appropriate in-game context. Continuing with the example above, a detected absence of game interface inputs at a decision point interpreted in isolation could correlate to a skill attribute of player indecision. However, the detected absence game interface input combined with a proximity of a player's character to an in-game obstacle could be correlated to skill attributes associated with a cautious player or a player capable of properly identifying and assessing threats to their goals.

The correlations between game attributes and skill attributes can also include a weighting of one or more of the game attributes and/or one or more of the skill attributes.

Since different interpretation metrics may interpret game attributes in different ways, and may analyze different game attributes to analyze similar skills, all game attributes are preferably stored from all game play scenarios played by a given player. For example, one interpretation metric can be configured to analyze the number of times a player fails through a trial-and-error approach before succeeding at a task in order to determine how persistent that player is, while another interpretation metric can be configured to analyze how long a player spends actively playing a game scenario before accomplishing a task in order to determine how persistent that player is. Typically, interpretation metrics can analyze overlapping sets of game attributes when deriving information about a player's skill attributes.

In embodiments, an interpretation metric can be used to derive a set of skill attributes based on the game attributes available to it, as well as derive the values of those skill attributes according to the values of the game attributes. Thus, the interpretation metric can be used to select a set of skill attributes from a global list of skill attributes, as well as determine the values for the selected skill attributes. This can be based on the correlation rules of the particular interpretation metric.

In embodiments, interpretation metrics can be game-specific, tailored to game attributes as applicable to a particular game and to incorporate the appropriate in-game context via correlations between game attributes.

In embodiments, interpretation metrics can require that one or more specific game attributes be present in a game such that the candidate job assessment be derived. Thus, if the system detects that one or more of the required game attributes is missing from a particular game, or from received game data, the system can issue an alert to an administrator, the player, or another user.

Job database 116 generally contains job profiles comprising a job title, description, and associated skill attributes, which are subjectively defined as skills a prospective employer would like a prospective employee to have. Such a job database is generally pre-populated with template job profiles, and is configured to allow a user of computer system 120 to insert new job profiles into the system as needed. This is particularly useful for employers who are particular about their employees, and may wish additional skill attributes above and beyond what a traditional employer may look for. For example, a job template for an administrative assistant position may have skill attributes for a charismatic job applicant that gets along with a variety of different types of individuals, is well organized, and has a basic grasp of traditional administration assistant skills like word processing and calendaring computer applications. An employer may wish to customize such a job template by adding that preferred skill attributes should also include an ability to have a flexible schedule that could be in the daytime on some days and in the evening other days, and a high propensity and willingness to research and plan business trip activities that include high quality food options. Such added skills could be listed as required skills or preferred skills, and could be ranked by an employer to create a customized employer template that searches for employees of a particular customized skillset.

In embodiments, interpretation metrics can be configured to focus on a particular skill attribute or particular set of skill attributes. Thus, an interpretation metric can be configured to use game attributes contributing to a desired set of skill attributes, such as those pertaining to a particular job.

Computer system 120 is shown euphemistically as a single computer tower, but could be a computer system comprising any number of processors, non-transient computer-readable mediums, and hardware components that are networked together to create a system capable of communicating information with each of skill attributes database 112, game attributes database 114, job profile database 116, gaming console platform 132, gaming computer platform 134, gaming mobile platform 136, and administration user interface 140.

Gaming console platform 132, gaming computer platform 134, and gaming mobile platform 136 are contemplated gaming platforms that players play games on, whose game attributes are recorded and stored by computer system 120. A gaming platform could be any computer system having one or more hardware and/or software sensors that collect game attribute data from a player's game scenario. As players play through one or more game scenarios, compute system 120 preferably records game attributes collected over time, so that when a prospective employer wishes to analyze a player as a prospective employee an interpretation metric could be applied to all historical data collected on that player. In some embodiments, computer system 120 could record landmark time periods to show improvement of a player's skill attributes over time. For example, game attribute data on a player could be organized by game attributes collected before a player's promotion and after a player's promotion to determine if a change in job had affected the player's skill attributes in one or more ways.

Computer system 120 could also be configured to push games to any of the gaming platforms 132, 134, 136, either on demand from a player using a gaming system or from a prospective employer. For example, a player might subscribe to a service that matches a player with a job prospect, and could request games that poll game data that are relevant to certain job types, such as games that are highly relevant to computer programming jobs or games that are highly relevant to accounting jobs. Or a job applicant might interview with a company that wants to know more about the job applicant's skill attributes, and pushes relevant games to the job applicant as part of the job interview process to glean data about the applicant. In some embodiments, computer system 120 allows an employer to define portions of a game to analyze how a player performs.

For example, if a company has a job opening for a personal training position, a company might define a game that proposes a first client with an overweight body type with high stamina, a second client with a highly muscular body type with low stamina, and an average body type with low stamina, which asks the job applicant to set up training regimens for each client and tweak them over time as each client progresses through a regimen. Or that company may not wish to define a new game, and may present a nutrition game or a sports game to the job applicant to glean skill attributes that may not be directly on point with the personal training position, but would still be useful to a job applicant who would fulfill that role. In other embodiments, the system could be configured to allow an employer to directly monitor a game as it is being played, and manipulate game elements dynamically to create or shut down challenges as the game is being played.

In embodiments, the games presented to the player can lack any identification or correlation of the employer providing the game, the position or job for which the evaluation of the player is taking place, and/or the skill attributes being evaluated via the player's gameplay. Thus, the player can play the game naturally and is prevented from tailoring or modifying their gameplay or behavior with the goal of impressing an employer or falsely inflating certain assessments.

In embodiments, an employer directly monitoring the game could create a custom evaluation of the players' skill attributes after the game scenario is completed. Computer system 120 could then be configured to evaluate one or more such evaluations to construct an interpretation metric based upon the game attributes observed during gameplay. A user of the system could select a subset of game attributes to be used in order to construct such an interpretation metric, which could be used to eliminate variables that are deemed irrelevant to the evaluation. In this manner, new interpretation metrics could be constructed through inference, instead of through user input.

Administration user interface 140 is shown euphemistically as a laptop computer, but could be any user interface that allows a user to both input data into computer system 120 and/or receive data from computer system 120 as needed. Preferably, administration user interface 140 allows an employer user to select skill attributes, game attributes, and job profiles, or define them, as needed. For example, an employer wishing to fill a job position might view a list of job profiles with matching skill attributes and select a job profile that appeals to that employer. The employer may then review the skill attributes associated with that job profile, and may add or remove skill attributes, and may prioritize skill attributes based upon which skill attributes that employer values over others.

Once the employer selects those skill attributes, the employer may then review various interpretation metrics that glean skill attribute data from game attribute information. Reviews, ratings, and creators of the interpretation metrics could be displayed to allow a user to pick between the various interpretation metrics to get a result that is agreeable to that employer. An employer might, for example, trust an interpretation metric from one company over an interpretation metric from another company, or may trust an interpretation metric that has been highly reviewed over an interpretation metric with negative reviews. An employer may wish for a plurality of interpretation metrics that each derive data for the same skill attribute and average out the score for that attribute, or may prioritize the score such that an interpretation metric that is more highly ranked by the employer would have a more influence over the skill attribute score over other interpretation metrics. In a preferred embodiment, a plurality of interpretation metrics are used to derive skill attribute data for a particular job applicant in order to flush out a full picture of relevant skills possessed by a job applicant.

Once the employer has made a selection of the job profile, skill attributes, and interpretation metrics, the employer could then direct computer system 120 to apply the interpretation metrics to its database of game attributes and derive a list of applicants that meet the criteria set by the employer. In embodiments, the list of applicants are presented to the employer in a prioritized list, for example by the number of skill attributes possessed, or by the highest average among the most preferred skill attributes, or by a particular skill attribute selected by the employer. Any suitable reporting mechanism could be used to sift through and filter through the job prospects. The employer might even choose a plurality of job applicants and push a new game to those job applicants as part of an interview process.

The new game might be a multiplayer game where other players in the game are other prospective job applicants, prospective coworkers, or current employees, allowing a side-by-side comparison of how job applicants perform next to one another or against current employees. An employer might play the role of game master in the game and introduce unexpected job scenarios that would test the employee in a hypothetical situation. The employer could alter game rules based upon behaviors, or such rules could change automatically as a function of strengths or weaknesses detected in a player. For example, an interpretation metric could be applied to game attributes collected thus far, and the system could detect that a player is a risk-taker, and place a risky situation in front of the player to verify this assessment. In another example, the system could detect that a player exceeds a threshold of skill attribute points for patience, and introduces a game scenario that tests how assertive the player is in dangerous situations. In such a situation, the game introduces a new scenario to test a new skill attribute as a function of an old, detected skill attribute.

In some embodiments, computer system 120 could present a user with a list of possible games as a function of the job candidate potential, where the games have game attributes that would help flush out and further clarify each player's skill attributes that correspond to those game attributes in accordance with the interpretation metrics used. The assessments from different interpretation metrics could be correlated with one another to determine which prospective employees have a higher potential than others. For example, players who score favorably among a plurality of interpretation metrics might have a higher job potential than players who only score favorably among one or two interpretation metrics.

Figure 2:
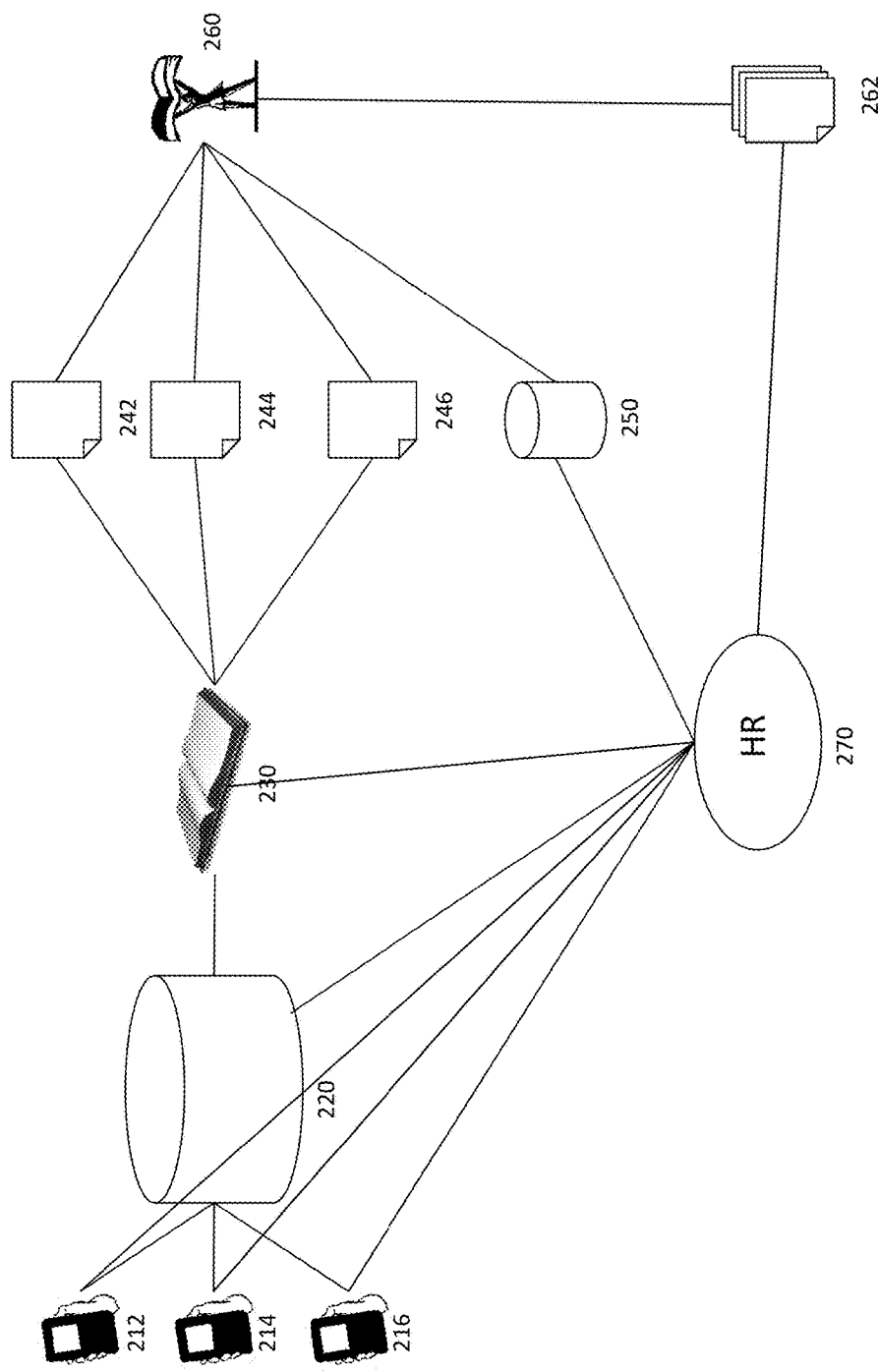
FIG. 2 is a schematic of exemplary software modules used to implement an embodiment of the inventive candidate assessment system.

FIG. 2 shows an illustrative example of contemplated software modules programmed to perform functions and processes associated with the inventive subject matter, executed in a contemplated candidate assessment system illustrated in FIG. 1, comprising gaming interfaces 212, 214, and 216, game attribute collection module 220, candidate matching engine 230, skill sets 242, 244, and 246, job profile module 250, job assessment engine 260, job assessment report 262, and human resources module 270.

Gaming interfaces 212, 214, and 216 could be software modules that allow the system to interface with modules that have game attribute information from game play scenarios. Such gaming interfaces could directly interface with gaming consoles, and/or could interface with game attribute repositories that house such game attribute information. Game attribute collection module 220 could then collect game attribute information through the various interfaces, which are then fed into candidate matching engine 230.

The candidate matching engine 230 derives one or more skill sets about a player from that player's game attributes according to one or more interpretation metrics. The candidate matching engine 230 then produces a set of skill sets 242, 244, and 246, each corresponding to a different interpretation metric for that player's game attributes. The skill sets 242, 244, and 246 may have overlapping skill attributes or may not have any overlapping skill attributes at all, but as a whole represent a plurality of skills possessed by the player, and preferably have quantifiable values assigned to show how well endowed the player is with such a skill attribute.

The job assessment engine 260, then analyzes the various skill sets 242, 244, and 246, in light of job profile information collected from job profile module 250 to arrive at one or more assessments of how well a candidate might fit with one or more job openings. That assessment is generally quantified to an employer as job assessment report 262, which is then fed to a human resources module 270, which then displays the job assessment report to an appropriate user to determine the potential of the job candidate to fulfill the job opening. Human resources module 270 could also be functionally coupled to each of game attribute collection module 220, candidate matching engine 230, and job profile module 250, to allow the module to configure at least some of the game attributes, interpretation metrics, and job profiles, respectively. In some embodiments, human resources module 270 is configured to push another game to a player through at least one of the gaming interfaces to collect additional game attribute data.

Figure 3:
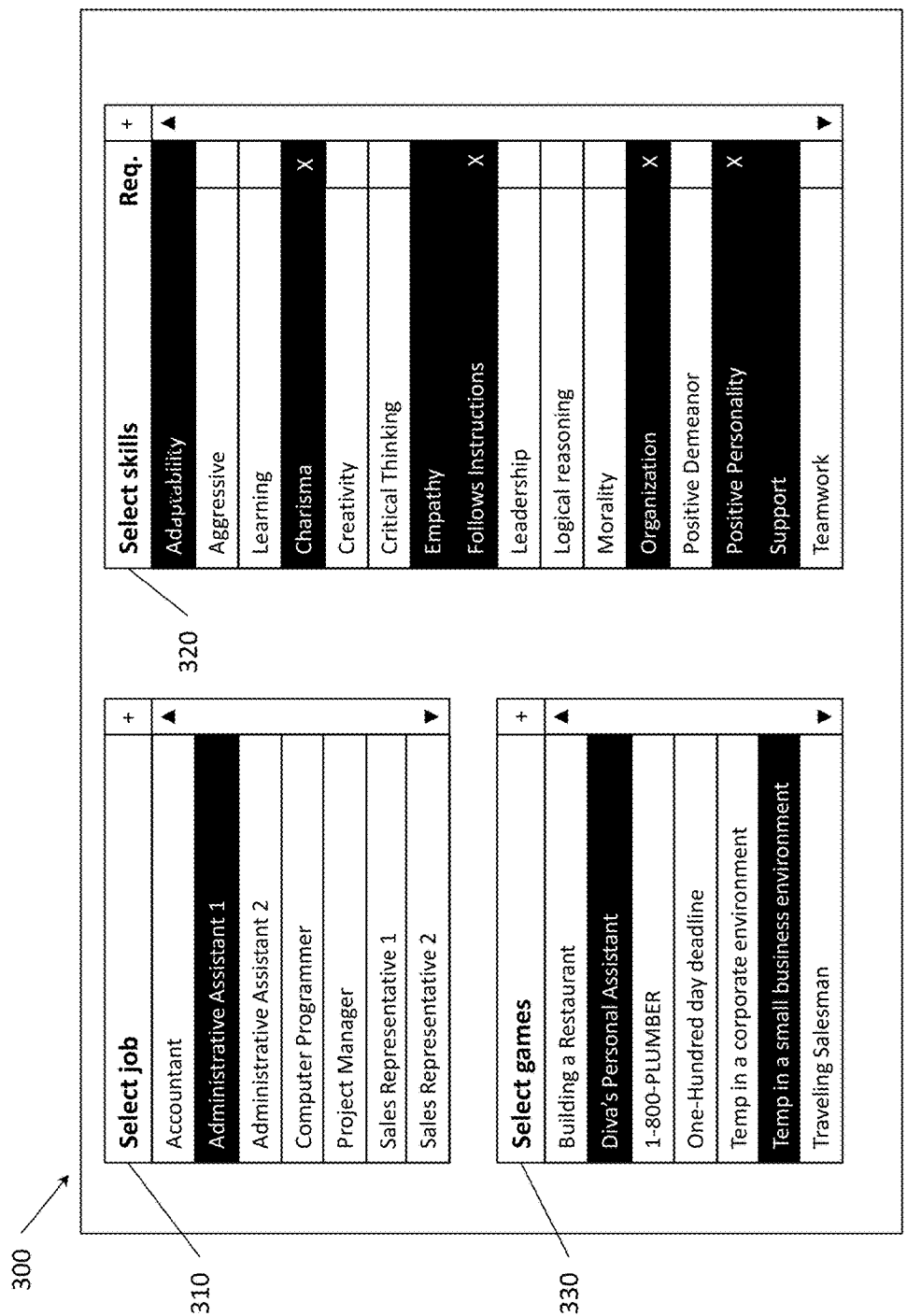
FIG. 3 is a screenshot of an exemplary user interface.

FIG. 3 shows an exemplary user interface 300 having a job selection interface 310, a skill selection interface 320, and a game selection interface 330. Generally, a user will select a job profile from job selection interface 310 having an associated skill set. Here, the user has selected the job "Administrative Assistant 1." The user could click on the "+" icon to create a new job profile with a new associated skill set if needed, and could scroll through the listing of available job profiles using the scrollbar to the right. Once a job profile is selected, a user could edit the skills associated with that job profile from the list of available skills via skill selection interface 320, or could add new skills using the "+" icon. The user could also tag skills with a required check if the user wants to prioritize that skill Other methods of prioritizing skills could be used, like a gradient or a numerical value assigned to a skill For example, a user could assign a high numerical value to the Charisma, Follows Instructions, and Organization skill attributes, and a somewhat numerical value to the Positive Personality skill attribute, which will be used to weight the first set of skill attributes more than the Positive Personality skill attribute. Once the job and skills are selected, games could be suggested by the computer system in game selection interface 330 through highlighting. Additional games could be selected by the user, and additional games could be designed or added by the user through use of the "+" icon.

Figure 4:
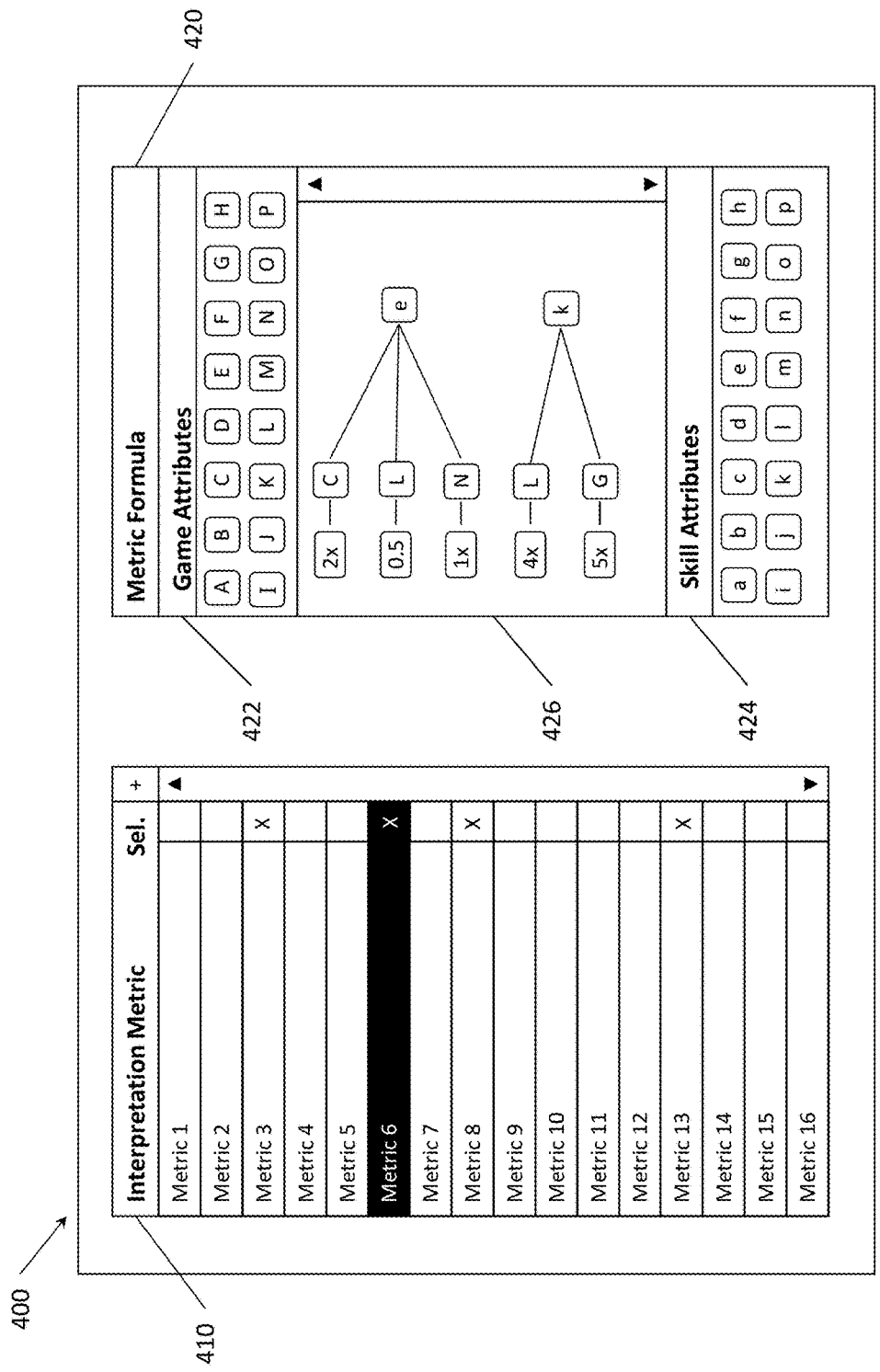
FIG. 4 is a screenshot of another exemplary user interface.

FIG. 4 shows another user interface 400 having an interpretation metric selection interface 410 and a metric formula interface 420. The metric selection interface 410 shows that a user has selected Metric 3, Metric 6, Metric 8, and Metric 13 to be used in order to derive skill attribute data from a player's game attribute data. Metric formula interface 420 has game attribute selection interface 422, skill attribute selection interface 424, and metric definition interface 426, which shows a definition for Metric 6. As shown, metric 6 derives two skills, skill "e" and skill "k". In this example, skill "e" is calculated by normalizing the result of a combination of weighting game attribute C by 2, game attribute L by 0.5, and game attribute N by 1, while skill "k" is calculated by normalizing the result of a combination of weighting game attribute L by 4 and weighting game attribute G by 5. Other methods of deriving a skill from a set of game attributes could be used without departing from the scope of the invention. A given interpretation metric preferably defines at least one or two skills, but could be configured to define any number of skills as a user sees fit.

FIG. 5 shows another user interface 500 showing an interpretation of a user Joseph Smith in accordance with interpretation "Metric 8", as presented to an employer, administrator, etc. User interface 500 shows game attribute results 510, skill attribute results 520, job position results 530 and suggested games interface 540. Game attribute results 510 show some of the game attributes that resulted from the many game scenarios played by Joseph Smith, while skill attribute results 520 show the skill attributes derived by interpretation Metric 8. Skill attributes for Empathy and Positive Personality have not been calculated because of a lack of game attribute data. The game notifies the user of this condition by displaying question-marks next to the skill attributes that cannot be derived.

The example of FIG. 5 provides a detailed illustration of the interpretation of player Joseph Smith. In embodiments, the user interface 500 can display a list of highest scoring candidates to a user, and a selection of a particular candidate then leads to the display shown in FIG. 5 showing the details associated with the selected candidate (in this case, Joseph Smith). The list of candidates can be presented according to an individual job of interest to the user (e.g., the job profile used in the evaluation), or across all jobs. The candidates can be sorted according to highest scoring for the particular job, according to a scoring of individual attributes, alphabetically, etc.

Job position fit 530 shows how well candidate Joseph Smith ranks as far as his potential for various job profiles previously selected by the user (e.g., employer, system administrator, etc). Each job profile contains a link to an information page (not shown) which could list additional data on the job profile, such as what skills were used to calculate the potential or how to get in contact with, or offer an interview to, Joseph Smith. In embodiments, the skill attributes 520 can display only those corresponding to a selected job from job position fit 530. Thus, if a user clocks on "Administrative Assistant 1", only the skill attributes associated with "Administrative Assistant 1" are displayed via skill attributes list 520.

In embodiments, the user interface 500 can be configured such that job position fit 530 displays only the job and fit score for the job requested by the user. Likewise, the displayed skill attributes 520 can be tailored such that only the attributes corresponding to the displayed job are presented.

Suggested games interface 540 shows suggested games calculated by the computer system which could be sent to Joseph Smith in order to collect additional game attributes to better flush out skill attributes. The system could be configured to suggest additional games that would provide game attributes that are required to derive the missing skill attributes. In other embodiments, the system could be configured to search for anomalies, like skill attributes that are abnormally high (like the Follows Instructions attribute at 100%) or abnormally low, and could suggest games that also test for such skill attributes to see if that derivation was just a fluke.

As used herein, an attribute that is "abnormally high" or "abnormally low" is set by a user or a system designer who provides a threshold, above which is abnormally high, and below which is abnormally low.

Figure 6:
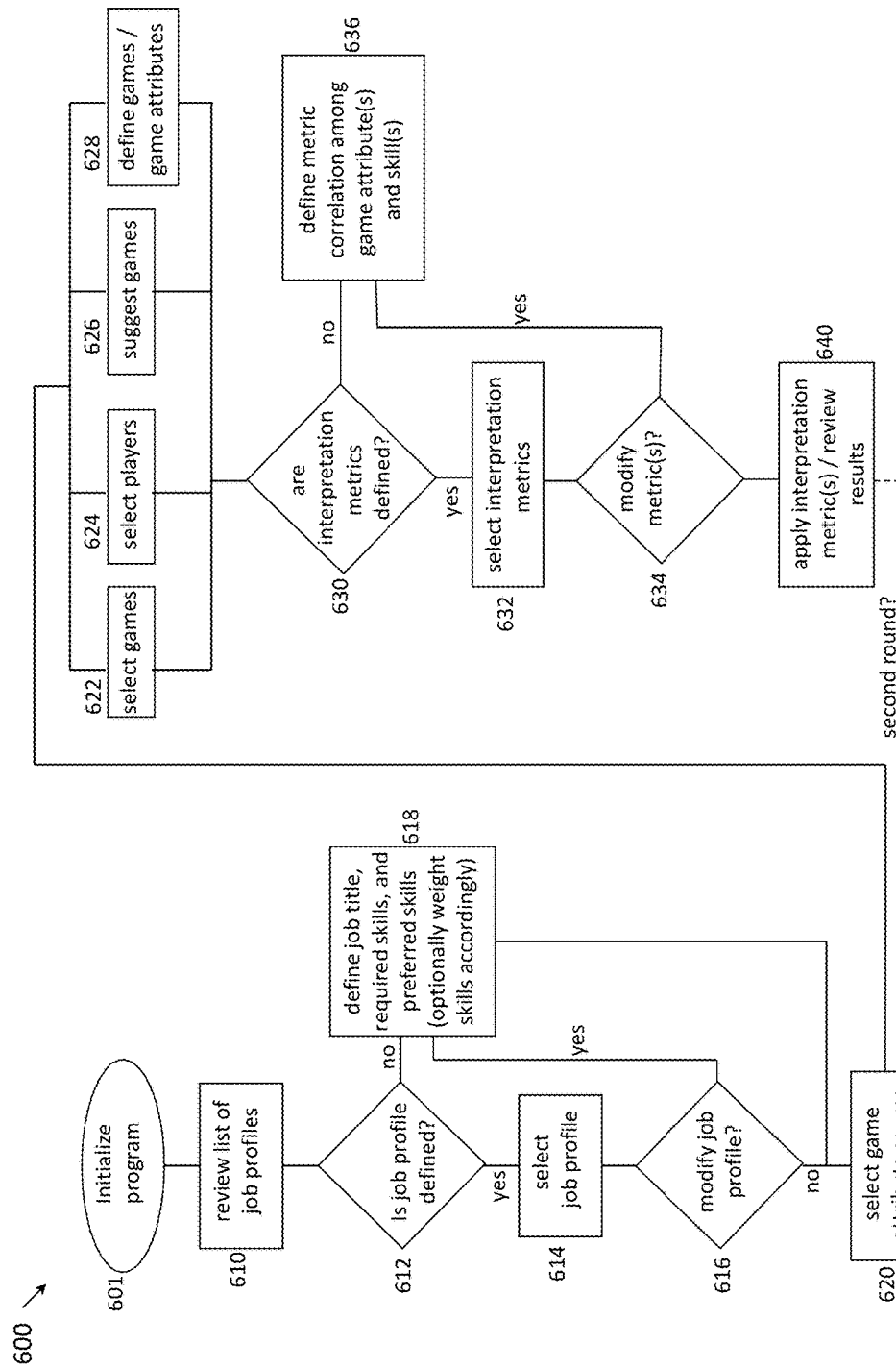
FIG. 6 is an exemplary flowchart describing exemplary programming logic of an embodiment of the inventive candidate assessment system.

FIG. 6 shows an exemplary flowchart 600 of a decision tree disclosing the programming logic flow of an embodiment of a candidate assessment system from the point of view of a user of the system. The user of the system typically initializes the system at step 601 by activating the program from a user interface, such as user interface 300. At step 610, the user can review a list of existing job profiles from job profile database 116, which holds existing defined job templates having job titles, descriptions, and job skill sets associated with the jobs. The job skill sets associated with a job could be separated into categories, such as required skills that must be above a specified threshold to be considered, and preferred skills that must be above a specified threshold to be considered, and the skills could further be weighted to arrive at a score. For example, a job profile for an administrative assistant could have required skills of charisma above a 70% threshold, instruction-following above an 80% threshold, and organization above a 70% threshold, and preferred skills of adaptability above a 60% threshold and empathy above a 70% threshold. Instruction-following and organization could be given twice as much weight as charisma, while organization and empathy could be given half as much weight as charisma. When reviewing the qualifications of such a candidate, a contemplated user interface could be configured to only show candidates having skill sets above the required skills would be shown, highlight candidates having skill sets above the required skills and preferred skills, and show a weighted score out of 100 calculated as (4O+4I+2C+A+E)/12, where O=Organization, I=instruction-following, C=Charisma, A=Adaptability, and E=empathy, and each of O, I, C, A, and E values are ranked out of 100.

If an appropriate job profile template does not yet exist in job profile database 116, a user could proceed to step 618 to define a job profile having appropriate skill sets assigned to the job profile. In addition, if a user wishes to modify an existing job profile template, the user could also proceed to step 618 to modify the job profile. Once one or more job profiles have been selected and defined, the user could proceed to step 620 to select the source of game attributes. In another embodiment, an employer, manager, or potential coworkers of a new job position could take a set of personality tests, which would populate a skills database of preferred skills for a new job candidate to work optimally with an employer. The system preferably has a database of skill attributes that are correlated with one another for such a matching. For example, a personality test could determine that a manager is domineering and aggressive. The database could correlate a domineering manager with an employee that follows directions, and an aggressive manager with an employee that is adaptable. Thus, the system would then add the skills "follows directions" and "adaptable" to the preferred skill set for the job profile.

Game attributes could be gleaned from job candidates in a variety of different ways. Game attributes from games that job candidates have already played are generally stored in a non-transient computer-readable medium, such as game attribute database 114. Where the game attributes already exist, a user could simply select the appropriate games in step 622, asking the system to glean game attribute data from all available job candidates. A user could also simply select the appropriate job candidates in step 624, which pulls all game attribute data from the selected players that currently exist in the database. Generally, a user would select both games and players to narrow down the search criteria. If game attribute data does not currently exist for the potential job candidates, or if the existing game attribute data is insufficient, a user could suggest games to one or more potential job candidates in step 626.

Some users may find the current game selection lacking, or may find the current list of game attributes gleaned from a game lacking. In such situations, a user might define a game or game attributes in step 628. For example, a user wishing to glean game attribute data about an administrative assistant might want to define a game scheduling parts that need to come into a warehouse that are used to build giant robots. Game attributes from such a game could be used to glean a job candidates' organization skills as well as ability to work under pressure. Or a user might like an existing game that analyzes a player's ability to build cookies as an elf inside a tree, but wants to analyze how many edible, but imperfect cookies are constructed in addition to analyzing how many perfect cookies and imperfect cookies are constructed. Such definitions could be defined by a user.

Once the game attribute sources are defined, and a user has a selection of job profiles and game attributes, a user could then proceed to step 630 to determine what interpretation metrics are used. A selection user interface like metric selection interface 410 could be presented for such a purpose. The user typically reviews a list of interpretation metrics already defined in a database, and selects the interpretation metrics in step 632. If a user wishes to modify an existing interpretation metric or define a new metric correlation, such a user could proceed to step 636 to define or modify an interpretation metric. A user interface such as metric formula interface 420 could be used to modify or define a new interpretation metric. For example, a user might define a candidate's patience by how long such a user pauses before undertaking a task. A game attribute for how long such a candidate pauses before each task could be gleaned, and users that have a pause of over 20-seconds might be awarded 30 points of patience while users that have a pause of over 40-seconds might be awarded 60 points of patience. Multiple game attributes could be defined for a single skill, for example an interpretation metric might only consider pauses when the user has more than 3 minutes on the game's overall timer, or an interpretation metric might award up to 60 points based upon a gamer's pauses before a task and might award up to 40 points based upon the number of times a gamer revisits a notebook or reviews his inventory before accomplishing a task.

As a corollary, a single game attribute could be utilized to derive a plurality of skills For example, the length of a pause before accomplishing a task could be used in a metric formula for deriving a user's patience quotient, but could also be used in a metric formula for deriving a user's initiative quotient. Different interpretation metrics could also interpret a player's skills in different manners. For example, one interpretation metric might analyze a player's game attributes having a high number of pauses and inventory checks as being a highly patient player, while another interpretation metric might analyze that same player's game attributes and determine that the player is a moderately methodical player.

In embodiments, the candidate matching engine 230 can execute functions and processes of the inventive subject matter as a variation of the flow chart illustrated in FIG. 6. In these embodiments a job profile selected at step 616 can have one or more associated interpretation metrics based on the skill attributes of the particular job, whereby the interpretation metrics corresponding to the job profile can be presented for selection at step 630 by the user prior to the selection of any games. Where interpretation metrics are correlated to specific games or specific sets of attributes that are present in certain games, the user can be given a selection of applicable games at step 622. The selection of a game at step 622 consequently results in the selection of the associated interpretation metric, and thus the user selection of metrics at step 630 can be removed.

Once a plurality of interpretation metrics have been selected, the candidate matching engine 230 generates a candidate assessment for a player at step 640 by applying the selected interpretation metrics to the game attributes of the player's gameplay, and thus deriving the corresponding skill attributes for the corresponding job profiles. The assessment can be presented to the user, whereby the user can review the results of the interpretation metrics applied to the game attributes and displayed in light of the job profiles (e.g., via user interface 500).

In embodiments, the candidate matching engine 230 can generate a first assessment based on a first interpretation metric associated with a first set of skills for the game attributes. For example, the first set of skills can be the set of skill attributes directly associated with a job profile for a particular job. Thus, in this example, the first assessment for this can be considered to be an evaluation for a "traditional" candidate for the job, based on the "traditional" skills desired for a job.

In these embodiments, the candidate matching engine 230 can then generate a second assessment based on a second interpretation metric associated with a second set of skill attributes. The second skill set can have some overlap with the first skill set, or can be a completely different skill set having no overlapping skill attributes. For the generation of the second assessment, the game attributes applied via the second interpretation metric can be the same set of game attributes as those used in the first assessment, have some (but not all) overlapping game attributes, or can be an entirely new set of game attributes selected based on the second skill set, corresponding to the second interpretation metric, or both. Continuing with the example, the second skill set can be corresponding to a second job profile for the particular job, whereby the individual skills are not those that are "traditional" to the job. Alternatively, the second skill set can be unrelated to the particular job, but can be associated with aspects of the particular job in isolation.

It is contemplated that the second skill set and/or the second interpretation metric can be selected by the candidate matching engine 230.

In embodiments, the candidate matching engine 230 can select the second skill set and/or the second interpretation metric can be selected on player attributes representative of characteristics of the player themselves. Examples of player attributes can include a player's gamer profile information, a player's current job, a player's job history, and a player's profile information gleaned from a social networking site. These player attributes can be stored on a database, such as a player database, and accessed by the computer 120 executing candidate matching engine 230.

In embodiments, the candidate matching engine 230 can select the second skill set and/or second interpretation metric based on the determined first candidate assessment. In these embodiments, a score associated with the first candidate assessment and/or one or more of the skill attribute values associated with the first assessment can be used to select the subsequent skill set and/or interpretation metric. For example, where a first candidate assessment shows a player scoring particularly low in a particular skill attribute, the candidate matching engine 230 can select the second skill set whereby the game attributes used to assess the low-scoring skill attribute correspond to a different skill attribute that is more positively scored. In another example, for the low-scoring skill attribute, a second interpretation metric can be selected whereby the skill attribute is reinterpreted as a positive. Thus, using the example illustrated above where a lack of interface input can be correlated to a skill attribute of indecisiveness according to a first interpretation metric, the second interpretation metric is selected such that the game attribute is instead interpreted indicating patience. In accordance with this second interpretation metric, additional game attributes are correlated to the second skill set and the second assessment determined for the player.

At step 640, the candidate matching engine 230 can also generate a job candidate potential for the player based on the generated candidate assessments. In embodiments, the job candidate potential can simply be the candidate assessments as presented in FIG. 5.

In embodiments where multiple job assessments are determined, the job candidate potential can include correlations between the assessments that provide a better overall representation of the candidate's aptitude f or the job. This can include averaging scores across assessments, and/or indicating which assessments the candidate scored highest in (i.e., indicating which interpretation most accurately represented the candidate's skill set).

The candidate matching engine 230 can analyze a candidate's gameplay statistics in accordance with a plurality of interpretation metrics, and follow-up games could be proposed as a second, third, fourth, or more interview rounds, bringing the user back to step 620 until an appropriate candidate is found. Thus, additional candidate assessments can be made for the additional games played, or additional scenarios within the same game. These additional assessments can be based one game attributes from previous game scenarios played as well as game attributes available to the current scenarios to determine the applicable game scenarios. The interpretation metrics used in subsequent game scenarios can be the first or second interpretation metrics used, or newly-selected interpretation metrics.

In embodiments, the candidate matching engine 230 can suggest additional games to play to validate previous assessments. The additional games can be direct simulations of the job or position that the player seeks to fill, whereby tasks associated with the game are directly correlated with measure of performance of the player's ability to do the job. For example, a first round of games could be sent to job candidates having attenuated job skills . . . such as a cookie-making game, a robot making game, and a babysitting game to analyze skills for an administrative assistant. The system can then suggest one or more non-attenuated games (i.e. job simulation game), such as an administrative assistant game or a corporate team-work game as a suggested follow-up game. As stated above, such games could be played in isolation as a one-player game, or could be configured to be multi-player so that different job candidates compete against one another, or even work with potential co-workers in a virtualized cooperative environment. User interface 500 or user interface 300 could be modified to indicate to a user whether a game is attenuated or non-attenuated for a job candidate.

The candidate matching engine 230 can determine a simulation assessment for the player, and correlate the candidate assessments for non-attenuated games to those of the simulation. The correlations performed by the candidate matching engine 230 can be a correlation between the skill attributes and their values for each non-attenuated game to the attributes and their scores in the simulation, and indicate comparisons, between the various skill attribute measures and consistencies among the various non-attenuated assessments and the simulation assessments. Whether a candidate scores highly on an assessment corresponding to a 'traditional' interpretation metric or on non-traditional interpretation metrics, the candidate should still be able to perform the simulation functions to a degree that demonstrate a direct aptitude to at least some of the job functions simulated in the simulation. Consequently, identified consistencies between non-attenuated assessments and the simulation assessments can be illustrated in the job candidate potential as showing the areas of the job that the candidate is strong in, or has potential in, as well as areas that may be lacking but able for improvement.

Other reasons why a user might wish to suggest follow-up games is to gather more game attribute information, or better game attribute information, on a job candidate. For example, by analyzing a job candidate's skill attributes in accordance with different interpretation metrics, statistical outliers could be detected that show that a job candidate might have potential in an area that would not be detected via traditional means. For example, if two interpretation metrics show that a job candidate has a mediocre aggressiveness index, but a third interpretation metric shows that same job candidate having an incredibly high aggressiveness index, a user might want to suggest a non-attenuated game to the job candidate and might want to review the play of that game to see just how aggressive that candidate is within a non-attenuated environment. Or a user might want to look at all interpretation metrics that derive the aggressiveness skill, and apply more interpretation metrics to the player's game attribute dataset to derive a more accurate value for the player's "aggressiveness" index. The system could group related skill attributes together, such as patience, thoroughness, and level of care, and could flag a situation (usually through some sort of notification) where a job candidate is be shown to have a high level of patience and thoroughness, but a low level of care, which might require further analysis.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A candidate assessment system comprising:
 a skills database configured to store skill attributes representative of job candidate skill characteristics;
 a first at least one non-transitory computer-readable storage medium containing instructions that, when executed by a first at least one processor, causes the one or more processors to:

collect a first plurality of game attributes and associated game attribute values, the first plurality of game attributes representative of a player's interaction with a game scenario encountered during a player's game session with a game, Wherein the first plurality of game attributes includes a first game attribute value corresponding to a detected absence of a game interface input and wherein the computer game excludes any identification of: a job, an employment position, an employer associated with the game, or any aspect of an evaluation of the player's interaction with the game scenario;

a candidate matching engine embodied on a second at least one non-transitory computer-readable storage medium and communicatively coupled to the skills database, the candidate matching engine configured to, when executed by a second at least one processor:

receive the first plurality of game attributes;

determine a first job candidate assessment for a particular job by:
  correlating a first game attribute set to a first talent skill set corresponding to the particular job according to a first interpretation metric, wherein the first game attribute set is selected from the first plurality of game attributes and wherein the first talent skill set comprises a first plurality of skill attributes associated with the particular job and wherein the correlating includes correlating the first game attribute corresponding to the detected absence of the game interface input to a corresponding first skill attribute from the first plurality of skill attributes; and
  deriving a skill attribute score for each of the first plurality of skill attributes based on a game attribute value of a correlated game attribute from the first game attribute set;

select a second interpretation metric by
  correlating the first game attribute from the first plurality of game attribute to a second skill attribute associated with the particular job according to the second interpretation metric;
  deriving a second skill attribute score for the second skill attribute based on the first game attribute value of the first game attribute; and
  determining whether the second skill attribute score is greater than a first skill attribute score of the first skill attribute;

determine, in response to determining that the second skill attribute score is greater than the first skill attribute score of the first skill attribute, a second job candidate assessment for the particular job by:
  correlating a second game attribute set to a second talent skill set corresponding to the particular job according to the second interpretation metric, wherein the second game attribute set is selected from the first plurality of game attributes and includes the first game attribute, wherein the second talent skill set comprises a second plurality of skill attributes associated with the particular job and includes the second skill attribute and wherein the second interpretation metric is different from the first interpretation metric; and
  derive a skill attribute score for each of the second plurality of skill attributes based on a game attribute value of a correlated game attribute from the second game attribute set; and determine a job candidate potential for the particular job for the player based on at least one of the first job candidate assessment and the second job candidate assessment.

2. The system of claim 1, wherein the first plurality of game attributes further includes at least one of a player input attribute, a player decision attribute, a player decision time attribute, a player path attribute, a game scenario outcome attribute, a game scenario score attribute, a game scenario rank attribute, a player game scenario skill level attribute, and a game scenario settings attribute.

3. The system of claim 1, wherein the skill attributes include at least one of a risk attribute, a decisiveness attribute, an impulse attribute, a critical thinking attribute, a learning attribute, a creativity attribute, a teamwork attribute, a leadership attribute, a support attribute, a demeanor attribute, a personality attribute, a logic attribute, a legal attribute, a thoroughness attribute, a morality attribute, an empathy attribute, a recollection attribute, a prioritizing attribute, a focus attribute, an emotion attribute, a determination attribute, a follower attribute, and an ambition attribute.

4. The system of claim 1, wherein the first plurality of skill attributes comprises an employer-selected set of skill attributes.

5. The system of claim 1, wherein the first talent skill set represents a first employment position and the first plurality of skill attributes represent required skills for the first employment position.

6. The system of claim 1, wherein the candidate matching engine is configured to select at least one of the second talent skill set and the second interpretation metric based on the first job candidate assessment.

7. The system of claim 1, wherein the candidate matching engine is configured to:
  receive player attributes associated with the player; and
  select at least one of the second talent skill set and the second interpretation metric based on at least one player attribute from the received player attributes.

8. The system of claim 1, wherein the candidate matching engine is configured to:
  receive a second plurality of game attributes representative of the player's interaction with a second game scenario in a second computer game;
  determine a third job candidate assessment for the particular job by correlating a third game attribute set to a third talent skill set corresponding to the particular job according to the first interpretation metric, wherein the third game attribute set is selected from the first plurality of game attributes and the second plurality of game attributes and wherein the third talent skill set comprises a third plurality of skill attributes associated with the particular job;
  determine a fourth candidate assessment for the particular job by correlating a fourth game attribute set to a fourth talent skill set corresponding to the particular job according to the second interpretation metric, wherein the fourth game attribute set is selected from the first plurality of game attributes and the second plurality of game attributes and wherein the fourth talent skill set comprises a fourth plurality of skill attributes associated with the particular job; and
  determine the job candidate potential for the particular job for the player based on at least one of the third job candidate assessment and the fourth job candidate assessment.

9. The system of claim 8, wherein the candidate matching engine is configured to select at least one of the second talent skill set and the second interpretation metric based on the first job candidate assessment and the third job candidate assessment.

10. The system of claim 1, wherein the game scenario comprises at least one of an entire game, a portion of a game, a level, a stage, a puzzle, an obstacle, an opponent, a challenge, a situation, and a simulated technical problem with the game.

11. The system of claim 1, wherein the game scenario comprises a role-playing game scenario, a combat game scenario, a puzzle game scenario, a driving game scenario, a flight simulator game scenario, a real-time strategy game scenario, a turn-based strategy game scenario, an adventure game scenario, a quest game scenario, a scavenger hunt game scenario, a card game scenario, and a game of chance scenario.

12. The system of claim 1, wherein the game scenario comprises at least one of a single-player game scenario and multi-player game scenario.

13. The system of claim 1, wherein the candidate matching engine is further configured to define a first job profile of a job opening requiring a job opening skill set, wherein the job opening skill set comprises the first talent skill set.

14. The system of claim 13, wherein the job opening skill set comprises the second talent skill set.

15. The system of claim 1, further comprising a gaming platform interface, wherein the candidate matching engine is configured to receive the first plurality of game attributes from the gaming platform interface.

16. The system of claim 15, wherein the first interpretation metric comprises a set of required game attributes, and wherein the candidate matching engine is further configured to trigger an alert when the first plurality of game attributes fails to contain data for at least one of the set of required game attributes.

17. The system of claim 16, wherein the candidate matching engine is further configured to push a second computer game to the gaming platform interface as a function of the set of required game attributes.

18. The system of claim 1, further comprising:
the at first at least one non-transitory computer-readable storage medium further includes instructions that, when executed by the first at least one processor, causes the at least one processor to:
record the player's game session;
collect the first plurality of game attributes and associated game attribute values from the recorded player's game session;
store the first plurality of game attributes in a database; and
the candidate matching engine is configured to determine the first job candidate assessment after the player's game session has ended.

19. The system of claim 1, wherein the candidate matching engine is further configured to:
determine the first job candidate assessment while the player's game session is ongoing;
determine that a skill attribute score corresponding to one of the first plurality of skill attributes or one of the second plurality of skills attributes exceeds a threshold score; and
in response to determining that the skill attribute score corresponding to the one of the first plurality of skill attributes or the one of the second plurality of skills attributes exceeds a threshold score, insert a second game scenario associated with the one of the first plurality of skill attributes into the computer game for the player to encounter during the game session.

20. The system of claim 1, wherein the first at least one non-transitory computer readable storage comprises the at least one second non-transitory computer readable medium and the first at least one processor comprises the at least one second processor.

* * * * *